United States Patent [19]

McCulloh

[11] Patent Number: 4,738,414

[45] Date of Patent: Apr. 19, 1988

[54] PARASAILING ASSEMBLY AND SYSTEM AND LAUNCHING THE SAME

[75] Inventor: Mark McCulloh, Key Biscayne, Fla.

[73] Assignee: Controlled Parasailing Corporation of America, Key Biscayne, Fla.

[21] Appl. No.: 837,730

[22] Filed: Mar. 10, 1986

[51] Int. Cl.⁴ .............................................. B64F 1/10
[52] U.S. Cl. .................... 244/63; 244/1 TD; 244/155 R; 114/61; 114/242; 114/253
[58] Field of Search ............... 244/63, 155 R, 155 A, 244/153 R, DIG. 1.2, 1 TD; 114/254, 61, 242, 253, 267; 441/130, 131

[56] References Cited

U.S. PATENT DOCUMENTS

| | | | |
|---|---|---|---|
| 2,803,839 | 8/1957 | Mosley | 441/131 |
| 3,426,716 | 2/1969 | Hackworth | 114/267 |
| 3,987,746 | 10/1976 | McCulloh | 244/155 A |
| 4,223,620 | 9/1980 | Dudouyt | 114/61 |

FOREIGN PATENT DOCUMENTS

| | | | |
|---|---|---|---|
| 1298406 | 6/1962 | France | 244/DIG. 1.2 |
| 1395715 | 3/1965 | France | 244/153 |
| 2560853 | 9/1985 | France | 244/DIG. 1.5 |
| 427517 | 6/1967 | Switzerland | 244/DIG. 1.2 |
| 1067488 | 5/1967 | United Kingdom | 114/253 |

*Primary Examiner*—Galen Barefoot
*Attorney, Agent, or Firm*—John Cyril Malloy

[57] ABSTRACT

A parasailing assembly structured for the safe support of a rider in a depending and supported relation from an air suspended or ascending parachute wherein the rider support and ascending parachute are launched from a launching platform on a tow boat. The parasailing assembly includes a rider support including a float structure thereon for the safety of the rider in the event of coming into contact with the water. The launch assembly on the tow boat is capable of launching and retrieving the parasailing assembly and rider in at least a partially mechanically automated manner.

15 Claims, 3 Drawing Sheets

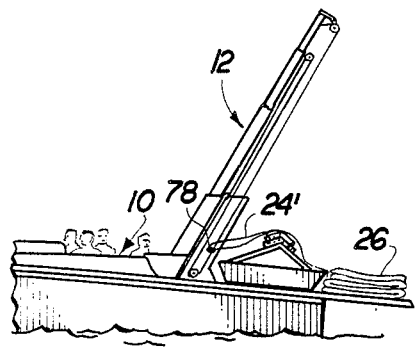
FIG. 1
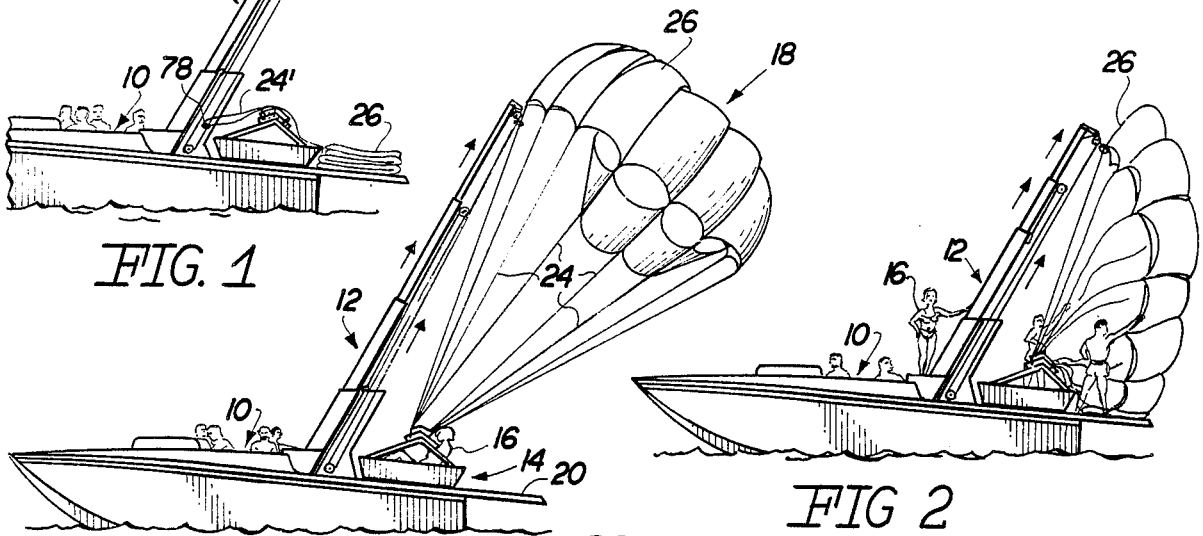
FIG. 2
FIG. 3
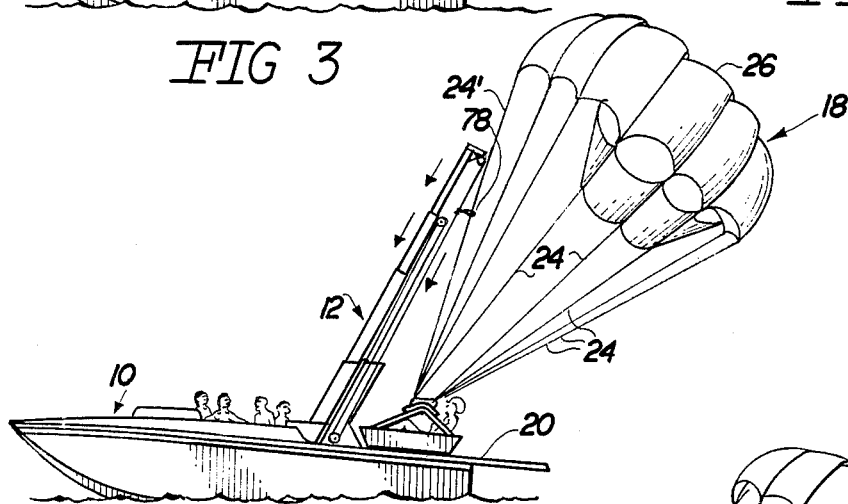
FIG. 4
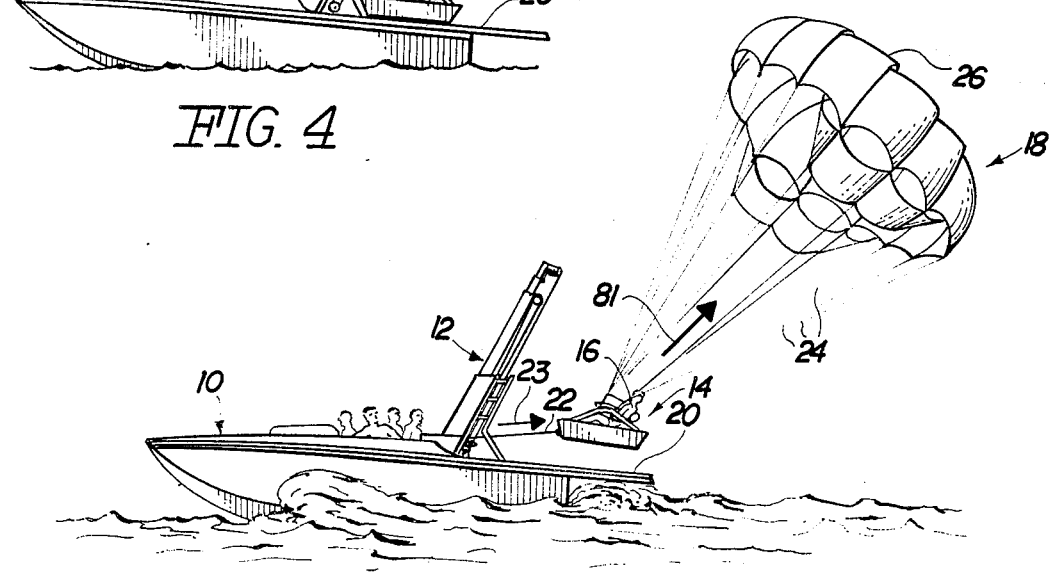
FIG. 5

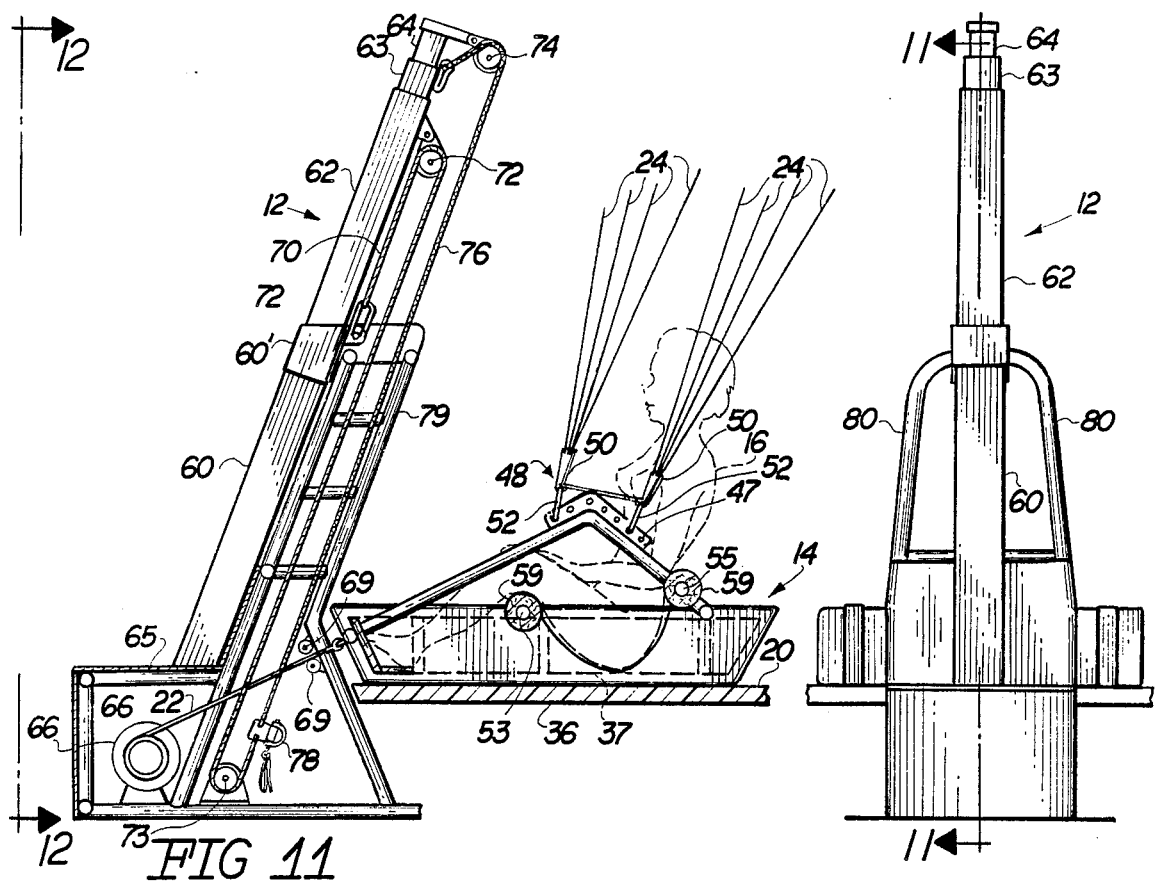
FIG 11
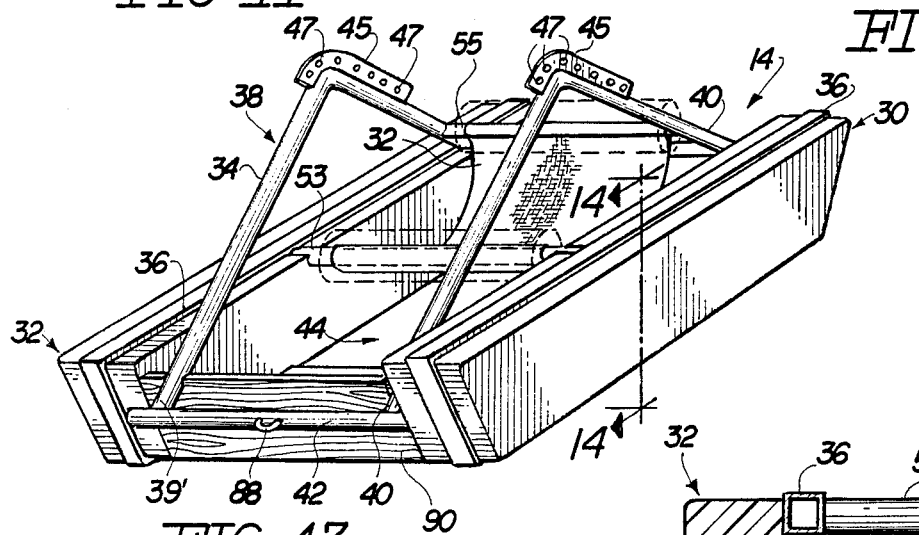
FIG. 12
FIG. 13
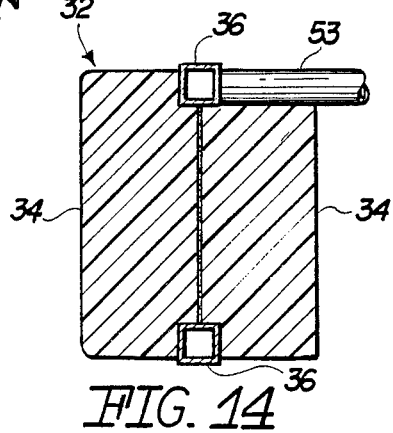
FIG. 14

PARASAILING ASSEMBLY AND SYSTEM AND LAUNCHING THE SAME

BACKGROUND OF THE INVENTION

1. Field of the Invention

This inventioin is directed to an apparatus associated with parasailing including means to support a rider or parasailer in a rider support incorporating a float structure and otherwise designed to allow the rider to be oriented in an substantially seated or partially reclined position when suspended from the ascending parachute. A launching assembly aids in both the launching and retrieval of the rider and parachute from the two craft.

2. Description of the Prior Art

The sport of parasailing is relatively new but has greatly increased in popularity in approximately the last five years. Accordingly, as pointed out in my U.S. Pat. No. 3,987,746 persons indulging in this sport have relatively few equipment innovations which render the sport more enjoyable and safer.

As a result of the lack of development of the general apparatus associated with the sport, participants frequently have used equipment designed for other generally similar sports such as water skiing, sky diving, hang gliding, etc. wherein such sports are associated with the necessity of launching and retrieving a person.

Perhaps one of the most prevelant problems in the sport of parasailing is the lack of proper safety features. This lack of proper equipment, especially equipment designed for the safety as well as comfort of the rider or parasailer has resulted in a great deal of unwarranted serious injuries and even death to the participant which, admittedly, under certain circumstances entails a certain amount of risk. Of particular risk to the rider is the standard harness used to support the participant from the parachute while parasailing. While these prior art harness structures are generally capable of providing adequate support, they have in the past provided serious safety hazards and actually caused death of the participant. Death was the result of the inability of the participant to remove himself from the harness when landing the water such as during boat failure and in relatively moderate to rough sea conditions.

In addition to the safety feature of needed equipment in this sport, it is also well recognized that a great deal of time and effort are required in order to ready the person or "rider" as well as his parasailing equipment for launching. Accordingly, there is a well recognized need for an improvement in the equipment associated with the sport of parasailing both from a safety standpoint, such as the rider support on which the occupant is suspended from the parachute, and also, in the launching equipment utilized for launching and retrieving of the parachute from a launching platform on a marine two craft.

SUMMARY OF THE INVENTION

The present invention is directed towards a parasailing assembly and more particularly, a rider support connected to an ascending parachute specifically designed and structured to retain and support a rider, substantially in a seated or partially reclined position while being suspended.

In addition, the subject invention is further directed to the system of launching and retrieving of the parachute and attached rider in a safe and efficient manner using mechanical apparatus which greatly reduces the preparation time associated with launching and/or retrieval.

More particularly, the parasailing apparatus of the present invention comprises a rider support incorporating a float assembly preferably having two float structures disposed in spaced apart parallel relation to one another and extending along the length of the rider support. The disposition and dimension of such float structure are such as to enable the support of at least a large male adult on a the surface of the water over which the two boat travels. While the sport itself does not contemplate the rider support or secured rider to land in the water, in certain emergency situations, such a landing may inadvertently occur. In such an event, the rider would be kept safe and be maintained in a floating posture on the surface of the water, instead of risking drowning when using prior art harness structures.

The subject rider support further includes a seat structure connected to and/or disposed between the aforementioned float structures wherein the seat structure is designed and configured to allow the rider or occupant to maintain a seated orientation or at least a partially reclined orientation well within the interior of the rider support, thereby adding to the comfort of the rider during the time of support and suspension from the air supported parachute. This of course differs from prior art or conventional apparatus associated with the supporting of the rider in depending fashion from the suspended parachute. Typically, such prior art devices include the connection of the harness about the upper torso of the rider thereby causing him to be truly suspended with his feet or lower body portion "dangling" from the ascending parachute. The above prior art device therefore not only adds to the discomfort of the occupant or rider but makes retrieval somewhat difficult and in certain situations unsafe.

Another feature of the present invention is the inclusion of a launching system and associated apparatus to effect and render more efficient and less time consuming the launching procedure as well as the retrieval procedure associated with the parasailing sport. Such launching facility includes the use of a telescopically structured boom extending outwardly along its own central longitudinal axis for the purpose of extending the length outwardly from its foundation or support platform on the tow craft itself. In addition, the boom structure is provided so as to be telescopically retracted wherein both the extension and retraction facilitates extension, inflation and support, retraction, respectively of the parachute during the launching and retrieval steps respectively.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature of the present invention, reference should be had to the following detailed description taken in connection with the accompanying drawings in which:

FIG. 1 is a side view in partial cutaway of the marine craft, rider support portion of the parasailing assembly and launching apparatus associated with the system for launching and retrieval of the prasailing apparatus.

FIG. 2 is a side view showing the parachute portion of the parasailing assembly in a contained and partially inflated position through activation of the launching apparatus associated therewith.

FIG. 3 is a side view of a rider support being occupied by a rider and the parachute in its inflated position.

FIG. 4 is a side view showing positioning of the launching apparatus in a position ready for release of its connection to the parachute portion of the parasailing assembly.

FIG. 5 is a side view of the parasailing assembly in a position immediately after launching.

FIG. 11 is a detail view in partial section showing structural details of the launching apparatus and the rider support wherein a rider or occupant is represented in phantom lines.

FIG. 12 is an end view along line 12—12 of FIG. 11.

FIG. 13 is a perspective view of the rider support with certain components of the seat structure represented in phantom lines.

FIG. 14 is a sectional view along line 14—14 of FIG. 13.

Like reference numerals refer to like parts throughout the several views of the drawings.

DETAILED DESCRIPTION OF THE PREFERRED EMBODIMENT

Figure 6:
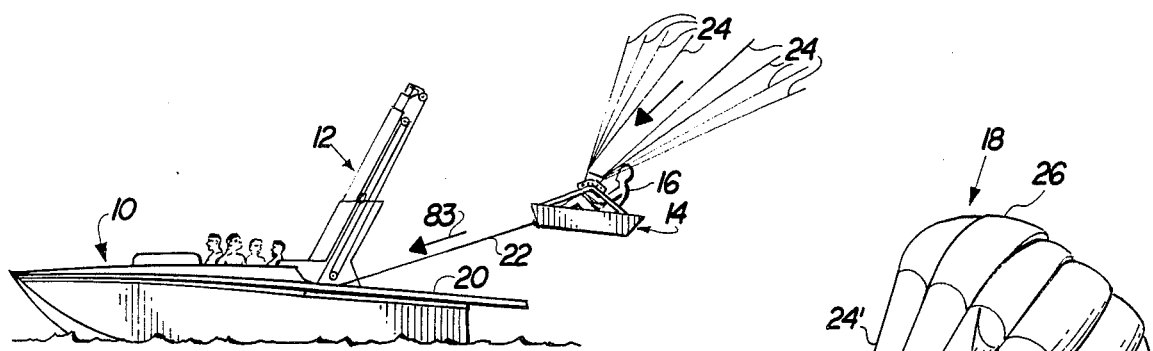
FIG. 6 is a side view of the marine craft and the connected parasailing assembly, being towed and immediately ready for retrieval.

With regard to FIGS. 1 through 14, the present invention is directed towards a parasailing assembly of the type mounted from a marine tow craft generally indicated as 10. A launching apparatus generally indicated as 12 is mounted on the boat 10 and is associated with the launching system for both launching and retrieval of the parasailing assembly. More specifically, the subject parasailing assembly includes a rider support generally indicated as 14 used to maintain a rider or occupant 16 in a seated or at least partially reclined position while suspended from ascending parachute 18. In typical fashion associated with the sport of parasailing, an ascending parachute generally indicated as 18 is inflated or suspended by the wind or alternately the rapid forward motion of the tow craft 10 causing the occupant and the rider support structure 14 to be "lifted" from a launching or support platform 20 of the marine craft as the tow line 22 is played out in accordance with the directional allow 23 (see FIG. 5). Also in accordance with conventional structural apparatus associated with the sport of parasailing, the rider support generally indicated as 14 is removably connected in depending relation from a plurality of shroud lines 24 which are secured in a depending fashion to the inflated or suspended sheet portion 26 of the ascending parachute. The term "inflated" as used herein relative to the inflation or suspension of the sheet portion 26 of the parachute does not in fact mean that the parachute necessarily contains inflatable portions but rather, that the sheet is expanded and suspended by on-rushing wind.

For purpose of clarity, the structural details of the present invention will be described particularly with regard to FIGS. 11 through 14 prior to the step-by-step operation of lauching and retrieval of the subject parasailing assembly as depicted successively in FIGS. 1 through 10. With regard to FIGS. 11 through 14, a rider structure generally indicated as 14 comprises a float assembly including two, spaced apart float structures generally indicates as 30 and 32 disposed in substantially parallel relation to one another on opposite sides of and extending along the length of the rider support 14. With regard to FIG. 14, each of the float structures include a pair of float elements 34 extending along the length of and at least partially incasing a rigid, relatively high strength material foundation 36 disposed at least partially on the interior of the float elements 34. Each of the float elements therefore are arranged on and partially define exterior sides of each of the float structures 30 and 32 as shown in FIG. 14. The foundation 36 is provided for reinforement and may be made from a metallic or even hight strength plastic material. Connection of the float elements 34 to one another occurs through apertures 37 (see FIG. 11) represented in phantom lines wherein adhesive interconnects the float elements 34.

The rider support further includes additional brace means generally indicated as 38 and including two brace members 39 and 40 having opposite ends 39' and 40' secured to a cross brace 42 extending adjacent to the leading portion of the rider support 14 with a similar structure provided at the following end of each brace member 39 an 40. Further, each of the members 39 and 40 extend from their respective opposite ends upwardly in a convergent fashion to a point above a seat structure 44 in which an occupant 16 is positioned. In addition, each of the brace elements 39 and 40 include an adjustment flange 45 having a plurality of apertures 47 secured therein in spaced apart relation to one another and extending along the length of the respective flanges. The adjustment flanges are provided for adjustable interconnection with a connecting means generally indicated as 48 wherein oppositely disposed, interconnected and spaced apart portions 50 is designed to be secured to a plurality of the shroud lines 24. Dependent upon the wind conditions, including strength, direction, etc., the individual attachments 52 can be secured to different ones of the apertures 47 other than that shown in FIG. 11. This varies the pitch or angle of connection of the parachute to the rider support 14 thereby taking into consideration wind conditions.

With regard to the seat structure, at least two seat braces 53 and 55 extend transversely across the width of the rider support 14 and are connected either to the foundation and/or the respective float structures 30 and 32. A sling or cradle type structure, which may be made of a flexible yet high strength canvas or like material 52 is strung between the spaced apart and parallel seat braces 53 and 55 and extends "deeply" into the interior of the rider support 14 and between float structures 30 and 32, so as to effectively "cradle" the lower or seat portion of the occupant 16. As emphasized in FIG. 11, the "deep seating" or placement of the rider 16 into the interior of the rider support 14 makes it extremely difficult or impossible for the rider to become inadvertently dislodged from the rider support 14 or fall therefrom. However, in the event that the rider support with the rider aboard lands in water, the rider can readily remove himself from the rider support. Alternately, the rider may choose to remain within the rider support 14 since the float structures 30 and 32 are specifically structured and dimensioned to maintain the rider free from excessive contact with the water. Cushion members 59 may be disposed in surrounding relation to the respective seat braces 53 and 55 wherein one cushion member is disposed in underlying and cushioning relation to the leg or knee portion of the occupant 16 wherein the other is disposed in underlying and cushioning and supporting relation to the back portion of the occupant 16.

Turning now particularly to FIGS. 11 and 12, the launching assembly 12 includes a boom having a main portion 60 and telescopically disposed outwardly extendable secondary portions 62, 63, and 64. This boom structure is fixedly secured to a housing and base 65 in which a winch and motor assembly 66 may be mounted for activation of the tow line 22. A pair of feeder pulleys 69 may be provided to regulate outward and inward travel of the two line 22 as clearly shown. In addition, the outward and inward travel of the respective boom portions is controlled by mechanical or hydraulic means of conventional design which is not shown for purposes of clarity. The boom structure or launching assembly 12 further includes a cable and pulley arrangement wherein one end of a first cable 70 as at 72 is secured in a substantially fixed position to an upper brace portion of the boom 60 as at 60'. A first, second and third pulley structure include first and third pulleys 72 and 74 movable with respective boom portions 62 and 64 and a second fixedly positioned pulley 73 serving as a guide for the first cable segment 70 and second cable segment 76. For purposes of retention, the first cable member 70 may be made of an extendable or expandable, somewhat elastic material to provide elongation in that the one end 72 is anchored and is not movable per se relative to the outward extension of the remaining boom members 62, 63 and 64. Accordingly, a constant tension is placed on the second cable seglemtn 76 and, more importantly, a releasable connector 78 is allowed to pass upwardly and outwardly of the boom housing 79. Reinforcing structure 80 is structured, dimesioned and configured to permanently arrange the launching assembly 12 including the boom structure at an angular orientation and therefore in cooperative relation to the launching platform 20, rider support 14 and parachute structure.

Turning to FIGS. 1 through 10, a step-by-step launching and retrieval procedure would include a FIG. 1 the boom assembly 12, being disposed in at least partially outward position wherein the pulley and cable assembly is connectable to a riser line or lead line of the shroud lines 24 as at 24'. This is accomplished due to the releasable connection facility 78 connected to the riser lines 24' on each side of the parachute sheet 26. With regard to Figure 2, a further outward extension of the launching assembly 12 or boom structure raises the sheet portion of the parachute 26 to a position where wind or air caused by natural conditions or the forward motion of the boat 10 can serve to fill and expand the parachute 18 as generally represented in FIG. 3. At this point, the occupant 16 is already in the rider support 14 ready for launching.

With reference to FIGS. 3, 4 and 5, it should be noted that in FIG. 3 the launching assembly or boom structure 12 is in its fully outwardly extended position so as to maintain the ascending parachute 18 fully inflated even though the rider support 14 and occupant 16 have not left the launching or support platform 20. However, when ready for launching, the boom assembly is retracted to a certain level such that releasable connector 78 may be manually opened so as to release the riser lines 24' of the shroud lines 24. This in turn totally disengages the parachute from the launching assembly 12 except of course for the existence of the tow line 22. As the tow line 22 is played out (see FIG. 5), the parachute again ascends due to its suspension of the passing air as indicated by directional arrow 81.

Figure 7:
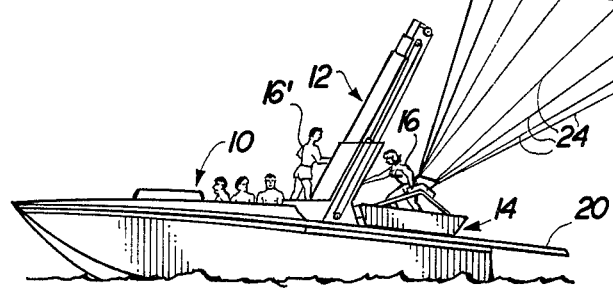
FIG. 7 is a side view of the parasailing assembly mounted on the launching platform of the two craft and occupants of the rider support are being changed.

Upon retrieving of the rider support 14 and occupant 16, the tow line 22 is retracted as indicated by directional arrow 83 to a point where the rider support 14 is in a substantially hovering position above the launching platform 20. Further pulling in of the tow line 22 causes the rider support 14 to land or be positioned immediately above the support platform 20. With reference to FIG. 7, the rider support 14 is maintained on the lauching pad 20 so that participants 16 and 16' may change places such as occupant 16 leaving the rider support 14 and participant 16' beginning to enter the rider support 14. It should further be noticed that a plurality of participants in addition to the driver may be carried by the tow craft 10 during the parasailing operation so as to eliminate the need to return to shore to pick up a new occupant or participant. Accordingly, utilizing the rider support 14 of the present invention, there is little time wasted in changing occupants since there is no need for any removal or attachment of complicated harness devices secured directly to the body of the participant.

Figure 8:
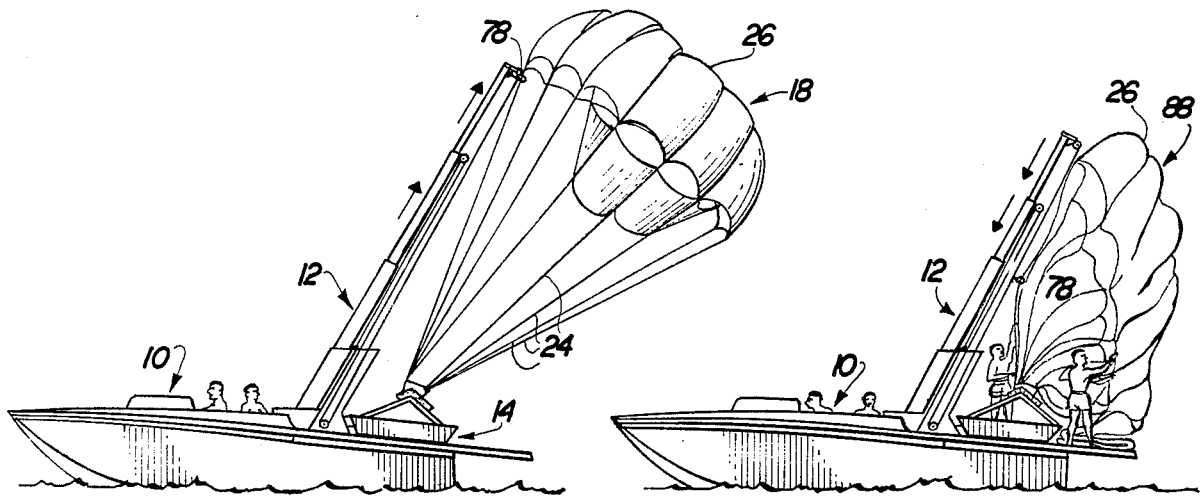
FIG. 8 is a side view of the launching apparatus engaging the riser lines of the parachute so as to maintain its inflation or suspension in the air while the rider support is mounted on the launching pad and the occupant or ride has disembarked therefrom.
Figure 9:
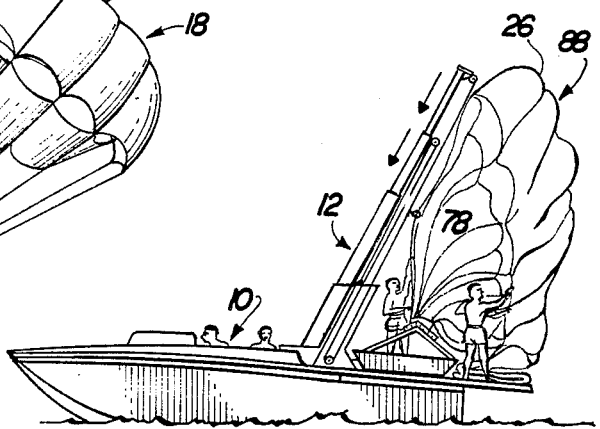
FIG. 9 is a side view showing the apparatus in its retained positioned relative to the parachute for attending to the collapse thereof and storage.
Figure 10:
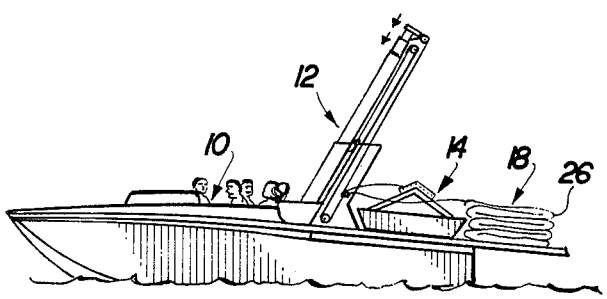
FIG. 10 is a side view of the subject tow craft with the launching apparatus in its stored position and the rider support and parachute also being stored on the craft.

If it is desired to maintain the parachute 18 in its inflated condition as shown in FIG. 8, for example when a new rider is to enter the rider support 14, the lauching assembly 12 including the boom is again fully extended so as to maintain the ascending parachute 18 so fully extended. However, if it is desired to collapse the parachute 18, the launching assembly 12 including the boom components are again retracted to a stored position thereby causing a total collapse of the sheet portion 26 of the parachute 18 for its storage and maintenance in a stored positon as shown in FIG. 10. Again, it should be emphasized that the removable coupling 78 is manually operated and the boom assembly must accordingly be raised and lowered such that a crew member can effectively attach and/or release the coupling 78 to the riser lines 24' as set forth above.

Additional structural features include a connector 88 mounted on a leading portion of rider support 14 adjacent a foot rest 90.

It is therefore to be understood that the following claims are intended to cover all of the generic and specific features of the invention herein described, and all statements of the scope of the invention which as a matter of language might be said to fall therebetween.

Now that the invention has been described, what is claimed is:

1. A parasailing assembly designed to support a rider on an air suspended parachute launched from and being supported by a tow boat, said assembly comprising:
 (a) a rider support connected in depending relation to the parachute and dimensioned and configured to support the rider in a substantially seated position, (b) connecting means for connecting the parachute to said rider support and configured for attachment thereto of shroud lines depending from the parachute sheet, (c) a connector structure mounted on said rider support and disposed and configured for attachment to a tow line, (d) said rider support comprising a float assembly formed of a buoyant material and positioned in supporting relation to a rider relative to a supporting surface of said rider support, (e) a launching assembly positionable in communicating relation to the ascending parachute and a pulley and cable assembly removably connected to riser lines of the parachute so as to selectively position the ascending parachute between a collapsed and an inflated position thereof, (f) said rider support positioned in a launched orientation; suspended by the parachute and returned from said suspended position by cooperative action of the tow line and said rider support and said boom structure with the ascending parachute.

(g) a brace structure secured to said rider support and extending substantially outward therefrom for securement to said connecting means, and (h) a seat structure disposed on said rider support and connected to and supported at least in part by said float structure.

2. An assembly as in claim 1 wherein said float assembly compises a foundation disposed in securing and at least partially supporting relation to said buoyant material, said foundation made from a substantially rigid, relatively high strength material and configured to reinforce said float assembly.

3. An assembly as in claim 1 wherein said float assembly comprises two elongted float structures disposed in spaced, substantially parallel relation to one another on opposite sides of said rider support and extending substantially along the length thereof.

4. An assembly as in claim 1 wherein said launching assembly comprises a boom structure including an extendable and retractable boom construction extendable outwardly along its length and in engaging relation to the parachute.

5. An assembly as in claim 3 wherein said seat structure is mounted between said two float structures and including a seat brace extending transversely to the length of said rider support and disposed and configured to supportingly cradle a portion of the rider's body therein.

6. An assembly as in claim 5 wherein said seat brace assembly comprises at least two seat brace elements disposed in spaced, substantially parallel relation to one another and including a first member disposed to fit beneath and in supporting relation to the rider's legs; and a second member disposed in supporting relation to a rider's back.

7. An assembly as in claim 6 wherein said seat structure further comprises a seat cradle extending between said first and said second members and disposed to support a lower portion of the rider's body when positioned in said seat structure.

8. An assembly as in claim 7 further comprising a foot support formed of rigid material and extending across a leading portion of said rider support between said spaced apart float structures.

9. An assembly as in claim 3 wherein said brace structure comprises two brace members disposed in spaced apart, substantially parallel relation to one another and each secured at its opposite ends to a substantially leading portion and a substantially trailing portion respectively of said rider support; each brace member configured to extend upwardly above said seat structure into attachment with the ascending parachute.

10. An assembly as in claim 9 wherein each of said brace members is secured at each of its opposite ends to said rider support and configured to converge upwardly from said opposite ends to a high portion of the respective brace members.

11. An assembly as in claim 1 further comprising an adjustment assembly secured to said rider support and disposed and structured for adjustable connection to said connecting means and adjustable support of said rider support by said ascending parachute.

12. An assembly as in claim 10 further comprising an adjustment assembly including an adjustment flange secured to an exposed portion of each of said brace elements and each adjustment flange dimensioned and configured for adjustable attachment to said connecting means on the parachute attached thereto, whereby location of supporting attachment of the parachute to the rider support depends, at least in part, on surrounding wind conditions.

13. An assembly as in claim 4 wherein said boom structure comprises a primary boom portion fixed to the tow boat at a fixed angular orientation and a plurality of supplementary boom portions telescopically extendable outwardly from said primary boom portion.

14. An assembly as in claim 4 wherein said boom structure in connectable to the ascending parachute and thereafter selectively positionable between an inflating position, supporting position, and retracted, stored position.

15. An assembly as in claim 4 wherein said pulley and cable assembly comprise a first cable segment structured to be at least partially extendable along its length, and a second cable segment connected between said first cable segment and one of said supplementary boom portions and maintained under tension by the former element when extended outwardly by the latter element.

* * * * *